A. DÉMICHEL.
ARTIFICIAL HORIZON FOR SEXTANTS.
APPLICATION FILED OCT. 29, 1909.
1,104,639.
Patented July 21, 1914.
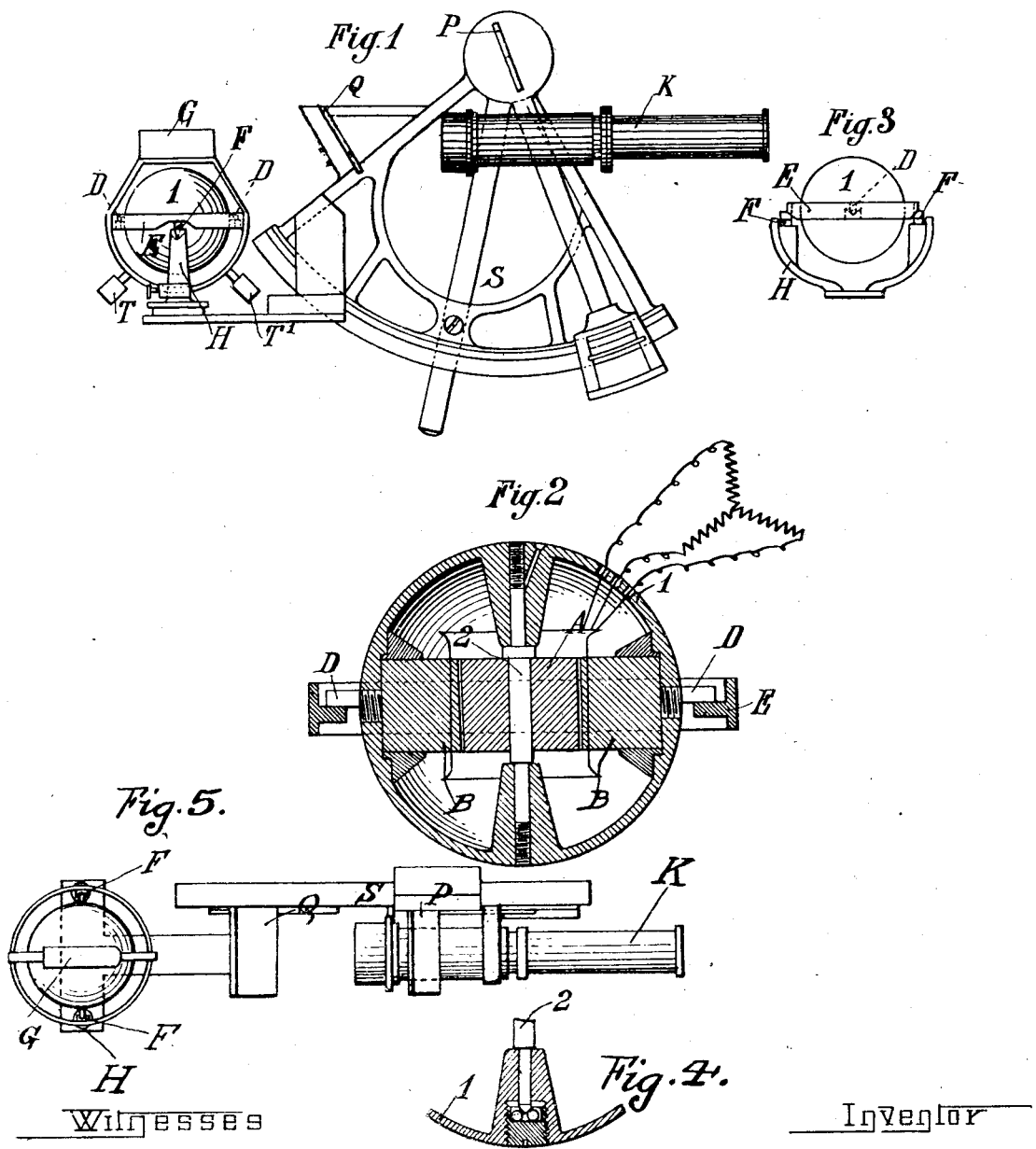

UNITED STATES PATENT OFFICE.

ALPHONSE DÉMICHEL, OF PARIS, FRANCE.

ARTIFICIAL HORIZON FOR SEXTANTS.

1,104,639. Specification of Letters Patent. Patented ......

Application filed October 28, 1909. Serial No. 825,401.

*To all whom it may concern:*

Be it known that I, ALPHONSE DÉMICHEL, a citizen of the Republic of France, residing at Paris, in the Republic of France, have invented certain new and useful Improvements in Artificial Horizons for Sextants, of which the following is a specification.

This invention relates to apparatus for obtaining an artificial horizon for sextant observations taken on board ship.

The apparatus consists of a gyroscope, the wheel of which is driven electrically at a practically constant speed and communicates to a collimator mounted on a movable Cardan frame oscillations of constant amplitude in a vertical plane passing through the axis of the telescope. This collimator has a reticle or cross-hairs which take the place of the horizon when the sextant is adjusted. The mean of two readings taken at the upper and lower limits of oscillation will be sufficient to give the exact horizon.

In order that the action of the invention may be more clearly understood one method of carrying out the invention is shown in the accompanying drawings, any other method adapted to give the same result being included in the scope of the invention.

With reference to the drawings:—Figure 1 is a view of the sextant with the gyroscopic attachment; Fig. 2, a detail on an enlarged scale of the gyroscope motor; Fig. 3 shows the suspension of this motor; Fig. 4, shows a modified form of construction for the bearing of the gyroscope wheel A. Fig. 5 is a plan view of Fig. 1.

Referring to Fig. 2, the movable armature A constitutes the rotating part of the gyroscope, the supporting apparatus being composed of a frame 1 on which the field magnets B are mounted. The frame 1 serves as support to the shaft 2 on which the movable armature A is mounted. The frame 1 is carried by two knife-edges D resting on a ring E. As the latter must be as light as possible, it may be made of aluminium with two grooved pieces of steel or hard stone for receiving the knife edges. The straight line formed by these edges is thus an axis of rotation passing approximately through the center of gravity of the whole. In order to complete the Cardan suspension, the circular frame E is in turn provided with two knife edges F, the edges of which also form a straight line at right angles to the edges of the knives D and also passing through the center of gravity of the arrangement. This shaft is carried by a fixed support H arranged on the sextant S. The whole consists of a wheel movable on an axle supported in turn by two horizontal frames mounted so that they can be oscillated about two axes at right angles.

A collimator telescope G formed of a tube having at one end a lens and at the other cross lines engraved on glass and placed in the focus of the lens, is fixed in any suitable way on the frame 1. The image of the cross hairs is thus formed at infinity, but the parallel rays emanating from each point are received by the objective of the telescope K of the sextant S, and are converged into the focal plane of the objective, so that the image is seen enlarged through the eye-piece.

In an electrically driven gyroscope, the requirements of construction of the motor necessitate the collimator being carried either above or below the axis at a considerable distance from the point of suspension. The result is that the same angular displacement of the gyroscope produces a greater linear movement of the collimator. It must be noted, however, that since the luminous rays emerging from the collimator are parallel, the displacement in question is immaterial and will not affect the adjustment of the telescope and of the reticle, the latter being clearly seen in spite of this movement. If, however, experience should show that this was not satisfactory the collimator may be placed at the side of the motor instead of above it. As the rays issuing from the collimator G only cover half the surface of the objective of the telescope K, the other half will receive as usual the image of the sun or star due to the double reflection on the mirrors P, Q, of the sextant S. The observer will therefore see at the same time the reticle and the image of the sun or star. The reticle being carried by the suspension frame will participate in the movement of precession imparted to the latter by the rotation of the gyroscope, but as the collimator does not revolve with the movable frame 1 the cross hairs will always be visible and in focus. Further it must be noted that the movement of the gyroscope being maintained in a continuous manner, the speed will be constant. The result is that the cone described by the movement of precession will have a constant angle. In the motion of precession the ends of the gyroscope move in circles, while the sphere oscillates about its center. From this it is evident that the reticle will apparently oscillate with vibrations of constant amplitude. Consequently observations of the maximum and minimum points of oscillation will be sufficient, the mean giving the exact position of the horizontal. By regulating the position of the center of gravity, the velocity of the precession will be controlled, that is to say, the interval of time which elapses between each period of vibration of the reticle. The electric gyroscope thus formed may be mounted on an ordinary sextant by any suitable means. The necessary current for operating the gyroscope motor may be derived from the electric installation of the ship or from any other independent source. It is evident that as installations may be direct current, alternating current, or polyphase current,—it is frequently necessary to interpose between the gyroscope and the ship's current, a small converter or the like.

In the gyroscope, it is possible to lubricate the pivot; and increased friction due to wear is negligible. The motive force being practically unlimited, it can always overcome all the increased resistances due to wear. It merely requires a slightly greater current to obtain the same speed. The pivot may be provided with a ball bearing (Fig. 4), which further diminishes friction. The magnitude of the power and the uniformity of its action also afford other advantages. In fact the disturbing influences due to external forces acting on the arrangement may be neglected, for instance, the rotation of the earth. This is, in fact, of little importance and it may seem preferable to reduce the speed in order to increase the velocity of the precession. The observations will gain in rapidity. The suspension on knife edges does not cause any inconvenience with the gyroscope if the speed is sufficient. The constancy of the speed also produces another advantage, because as a result the amplitude of the oscillatory movement of the cross hairs is constant. In observations requiring the reading of a maximum and a minimum, it is no longer necessary that the two readings shall be consecutive, and if a cloud prevents the second, the observation of the next minimum may be employed. As the collimator is fixed its length may be increased and a greater focal length obtained so that the image of the cross hairs is larger, while retaining the same angular value. The magnification being greater the lines may be made thinner so that greater precision is obtained. The apparent thickness of the lines of the image is governed not only by the engraving, but also by the nutation, because the actual path of a point is composed of an infinite number of very small circles, whose centers lie on the circle of precession, and it is the diameter of these nutation circles which determines the apparent thickness of the lines of the image seen in the telescope. The diameter of these circles becomes smaller as the speed is increased. To take advantage of this it is therefore of importance to increase the latter as much as possible. On the other hand the duration of the precession increases proportionately and it is a great disadvantage to allow too great an interval of time to elapse between successive observations. This is, however, easily and simply remedied by lowering the center of gravity of the gyroscope below the plane of the axes of suspension. In the example shown in the drawings two counterweights T T' have been added for this purpose. It is therefore possible to combine the two elements so as to obtain the best possible results for taking observations.

The arrangement previously described avoids the disadvantages entailed if the collimator rotates with the revolving part and provides that its only motion shall be that due to the very slow movement of the precession. There is therefore no need to fear the deformation of the collimator due to the action of centrifugal force. The cross-hairs being continuously in sight, its sharpness is most satisfactory, especially as the collimator can be lengthened.

I declare that what I claim is:—

1. In combination, a sextant, a frame and means for pivotally supporting said frame on the sextant, a collimator attached to said frame, and a gyroscope with means for pivotally supporting it within the frame.

2. In combination, a sextant, a bracket attached thereto, a frame and knife edge supports adapted to carry said frame on the bracket, said knife edge supports having their axis in a plane at right angles to the plane of the sextant, a collimator attached to the frame, and a gyroscope with knife edge supports for bearing it within the frame, the latter knife edge supports having their axis parallel to the plane of the sextant.

3. In combination, a sextant, a gyroscope, a collimator, a Cardan suspension comprising members by which the collimator and gyroscope are respectively supported, means for counterweighting the member of the Cardan suspension on which the collimator is carried, and means for attaching the Cardan suspension to the sextant.

4. In combination, a sextant, a gyroscope, a collimator, a Cardan suspension comprising members by which the collimator and gyroscope are respectively supported, means for counterweighting the member of the Cardan suspension on which the collimator is carried, means for attaching the Cardan suspension to the sextant and means for actuating said gyroscope by an electric current.

In witness whereof, I have hereunto signed my name this 15 day of October 1909, in the presence of two subscribing witnesses.

ALPHONSE DÉMICHEL.

Witnesses:
ANTONIN MONTEILHET,
H. C. COXE.